US012361456B2

(12) United States Patent
Ghorbani

(10) Patent No.: US 12,361,456 B2
(45) Date of Patent: Jul. 15, 2025

(54) SYSTEMS AND METHODS FOR PROCESSING MULTIMEDIA DATA

(71) Applicant: Shopify Inc., Ottawa (CA)

(72) Inventor: Siavash Ghorbani, Bromma (SE)

(73) Assignee: Shopify Inc., Ottawa (CA)

( * ) Notice: Subject to any disclaimer, the term of this patent is extended or adjusted under 35 U.S.C. 154(b) by 228 days.

(21) Appl. No.: 17/972,651

(22) Filed: Oct. 25, 2022

(65) Prior Publication Data

US 2023/0394537 A1 Dec. 7, 2023

Related U.S. Application Data

(60) Provisional application No. 63/347,779, filed on Jun. 1, 2022.

(51) Int. Cl.
| | |
|---|---|
| *G06Q 30/02* | (2023.01) |
| *G06Q 30/0282* | (2023.01) |
| *G06T 19/00* | (2011.01) |
| *G06V 20/40* | (2022.01) |

(52) U.S. Cl.
CPC ......... *G06Q 30/0282* (2013.01); *G06T 19/00* (2013.01); *G06V 20/40* (2022.01)

(58) Field of Classification Search
CPC ............... G06Q 30/0282; G06T 19/00; G06T 2219/2012; G06T 2219/2024; G06T 17/00; G06T 19/20; G06V 20/40; G06V 10/00; G06V 20/64
See application file for complete search history.

(56) References Cited

U.S. PATENT DOCUMENTS

| | | | | |
|---|---|---|---|---|
| 10,049,500 | B2 * | 8/2018 | Morrison | G06F 30/13 |
| 10,475,103 | B2 * | 11/2019 | Hiranandani | G06Q 30/0631 |
| 10,482,674 | B1 * | 11/2019 | Wu | G09B 25/00 |
| 10,872,322 | B2 * | 12/2020 | Siddique | G06Q 30/0643 |
| 11,694,400 | B2 * | 7/2023 | Delgado | G06T 15/50 |
| | | | | 345/426 |
| 11,893,693 | B2 * | 2/2024 | Wade | G06F 16/44 |
| 11,972,521 | B2 * | 4/2024 | Vaish | G06T 15/08 |
| 11,978,161 | B2 * | 5/2024 | Righetti | G06T 15/205 |
| 12,062,114 | B2 * | 8/2024 | Wiesel | G06T 11/00 |
| 2016/0203361 | A1 * | 7/2016 | Black | G06T 7/75 |
| | | | | 382/203 |
| 2016/0210602 | A1 * | 7/2016 | Siddique | G16H 10/60 |
| 2018/0121988 | A1 * | 5/2018 | Hiranandani | G06T 7/74 |
| 2018/0190033 | A1 * | 7/2018 | Barnett | G06N 20/00 |
| 2019/0096135 | A1 * | 3/2019 | Dal Mutto | G06F 18/24765 |
| 2022/0383400 | A1 * | 12/2022 | Wade | G06Q 30/0623 |
| 2024/0070969 | A1 * | 2/2024 | Vaish | G02B 27/017 |
| 2024/0362859 | A1 * | 10/2024 | Singh | G06T 17/00 |

\* cited by examiner

*Primary Examiner* — Vijay Shankar
(74) *Attorney, Agent, or Firm* — Rowand LLP

(57) ABSTRACT

A computer-implemented method is disclosed. The method includes: obtaining, via a first computing device, video data of a first product review video for a product; identifying a portion of the first product review video depicting the product; extracting surface textures of the product based on the identified portion of the first product review video; obtaining a first three-dimensional representation of the product; and generating an updated three-dimensional representation of the product based on the extracted surface textures and the first three-dimensional representation.

20 Claims, 9 Drawing Sheets

SYSTEMS AND METHODS FOR PROCESSING MULTIMEDIA DATA

FIELD

The present disclosure relates to multimedia processing and geometric modeling and, in particular, to systems and methods for modeling objects that are represented in multimedia data.

BACKGROUND

Digital media present wide-ranging options for disseminating product information. As a specific example, videos depicting products may be distributed on digital media platforms. Such product-related digital content may be created by vendors or purchasers of the products. Vendors may create product videos for promotional advertisements, while customers may create review videos (e.g., unboxings, product reviews, etc.) for describing their experience with products that they have used.

User-generated content may be relied on as a valuable source of product information for prospective customers. Traditional e-commerce and media platforms statically provide such content to users of the platforms. For example, user-generated videos, animations, images, etc., containing product information are generally uploaded by the content creators, such as merchants and product reviewers, and presented as-is to other platform users, without customization or analysis of content.

BRIEF DESCRIPTION OF THE DRAWINGS

Embodiments will be described, by way of example only, with reference to the accompanying figures wherein.

DETAILED DESCRIPTION OF EMBODIMENTS

Figure 1:
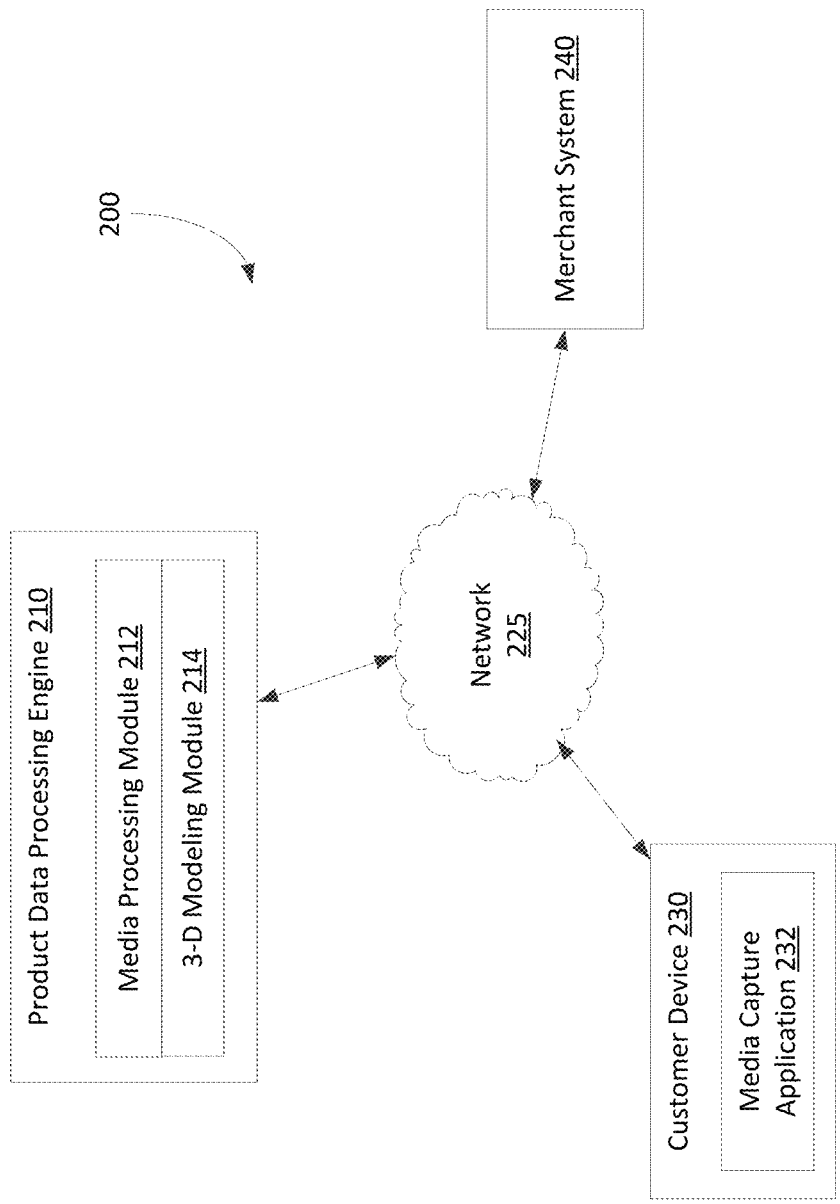
FIG. 1 illustrates an example system for processing product videos, including a product data processing engine.

User-generated content is a valuable source of product information for merchants and customers. Digital media, such as videos, images, etc., generated by users of a product can serve as feedback to a vendor of the product and as a useful data point in research by prospective purchasers of the product. The product-related content may be hosted and distributed online via, for example, various e-commerce and digital media platforms. These platforms typically provide the content statically—product-related content that is shared by the content creators is presented as-is to users of the platforms, without customization or analysis of the content.

Conventional digital media systems that facilitate access to user-generated content are limited in providing customized data relating to the content. In particular, these systems are generally not equipped to analyze the user-generated content to glean any useful information about products that are featured. As a result, customers may often need to conduct extensive research to acquire relevant information about products that they have purchased or are interested in purchasing. For example, if a certain product has a large number of user-generated reviews or product videos on a platform, a prospective customer may find it challenging or inconvenient to evaluate a high volume of media content to extract relevant product- and variant-specific information. As another example, if a purchaser of a product experiences certain issues or has inquiries about the product following the purchase, a platform hosting the product-related content may not have an effective mechanism for providing relevant and customized product information (e.g., repair recommendations, etc.) for the purchaser on an ongoing basis.

In an aspect, the present application discloses a computer-implemented method. The method includes: obtaining, via a first computing device, video data of a first product review video for a product; identifying a portion of the first product review video depicting the product; extracting surface textures of the product based on the identified portion of the first product review video; obtaining a first three-dimensional representation of the product; and generating an updated three-dimensional representation of the product based on the extracted surface textures and the first three-dimensional representation.

In some implementations, obtaining the first three-dimensional representation of the product may include obtaining, via a second computing device, an initial three-dimensional representation of the product.

In some implementations, extracting the surface textures of the product may include determining a mapping between the first three-dimensional representation and one or more two-dimensional representations of the product in video frames of the first product review video, the one or more two-dimensional representations corresponding to faces of the first three-dimensional representation.

In some implementations, generating the updated three-dimensional representation may include processing video frames of the first product review video using a machine learning (ML) model trained on product review videos for the product that are received from a plurality of first computing devices.

In some implementations, the method may further include validating the first product review video based on at least one of user-inputted information or metadata associated with the first product review video.

In some implementations, validating the first product review video may include matching the user-inputted information or metadata with stored product information associated with the product.

In some implementations, identifying the portion of the first product review video depicting the product may include performing object recognition for recognizing the product using video frames of the first product review video.

In some implementations, the method may further include: detecting, based on the extracted surface textures, at least one condition associated with the product; and generating an indication identifying the detected at least one condition.

In some implementations, detecting the at least one condition may include identifying a customer interaction associated with the detected at least one condition.

In some implementations, the customer interaction may include one of: an order delivery event; a product unboxing event; or a product review event.

In some implementations, the method may further include: receiving, via a first computing device, a product search query; and performing a product search based on the search query and the updated three-dimensional representation of the product.

In some implementations, the method may further include obtaining camera data and LiDAR scanner data associated with the first computing device, wherein the updated three-dimensional representation is generated based on the camera data and the LiDAR scanner data.

In another aspect, the present application discloses a computing system. The computing system includes a processor and a memory coupled to the processor. The memory stores processor-executable instructions that, when executed, configure the processor to: obtain, via a first computing device, video data of a first product review video for a product; identify a portion of the first product review video depicting the product; extract surface textures of the product based on the identified portion of the first product review video; obtain a first three-dimensional representation of the product; and generate an updated three-dimensional representation of the product based on the extracted surface textures and the first three-dimensional representation.

In another aspect, the present application discloses a non-transitory, computer-readable medium storing computer-executable instructions that, when executed by a processor, are to cause the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. Specifically, variable product data refers to product data that may be changed automatically or at the discretion of the merchant offering the product.

In the present application, the term "e-commerce platform" refers generally to computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extended by connecting one or more additional sales channels representing platforms where products can be sold. In particular, the sales channels may themselves be e-commerce platforms, such as Facebook Shops™, Amazon™, etc.

In the present application, the term "product video" refers generally to video that contains product information. Specifically, a product video is a video having content that includes information about one or more products. A product video may visually depict a product and at least some of the product's features. Additionally, or alternatively, a product video may include a description of a product in textual and/or audio format. Examples of product videos include promotional videos (e.g., commercial advertisements), unboxing videos, customer review videos, and the like.

Digital Media Processing

The present application discloses solutions for addressing some of the aforementioned technical limitations of digital media hosting systems. A multimedia processing system is disclosed. The system obtains user-generated content relating to products and models objective data of the products, such as three-dimensional representations of the products. The models are built based on user-generated digital media, such as product videos, images, and the like. The system crowdsources product-related digital media content from a plurality of users of the product. In particular, the digital media content may be obtained from product users at different times during their usage of the products.

The disclosed system models three-dimensional representations of products. Specifically, the system processes user-generated digital media content to extract surface texture data of a product and uses the surface texture data to build or update a three-dimensional representation of the product. The system employs machine learning techniques, by training (or re-training) machine learning models using surface texture data collected from the user-generated digital media content. The trained models can then be used for recognizing information about the featured products.

The proposed system and methods represent improvements in digital media processing and e-commerce technologies, at least, by enhancing access to relevant product data, such as real-time monitored conditions, of products that are featured in user-generated multimedia content.

Reference is first made to FIG. 1, which illustrates, in block diagram form, an example computing environment 200 for processing digital media. As shown in FIG. 1, the computing environment 200 may include a product data processing engine 210, customer devices 230, merchant system 240, and a network 225 connecting one or more of the components of computing environment 200.

As illustrated, the customer devices 230 and the merchant system 240 communicate via the network 125. In at least some embodiments, each of the customer devices 230 and the merchant system 240 may be a computing device. The customer devices 230 and the merchant system 240 may take a variety of forms including, for example, a mobile communication device such as a smartphone, a tablet computer, a wearable computer (such as a head-mounted display or smartwatch), a laptop or desktop computer, or a computing device of another type.

The merchant system 240 is associated with a merchant. In particular, the merchant system 240 may be a computing system that is controlled and/or managed by a vendor of one or more products. The customer devices 230 are associated with customers. Specifically, the customer devices 230 are devices of customers that have purchased or used one or more products offered by the merchant. As shown in FIG. 1, customer devices 230 may include one or more media capture applications 232. A media capture application 232 is software that can be used for recording digital media, such as videos, photos, etc. The captured media data may be stored on the customer device 230 and/or transmitted to one or more connected computing systems.

A product data processing engine 210 is provided in the computing environment 200. The product data processing engine 210 may be a software-implemented module containing processor-executable instructions that, when executed by one or more processors, cause a computing system to carry out some of the processes and functions described herein. In some embodiments, the product data processing engine 210 may be provided as a stand-alone service. A computing system may engage the product data processing engine 210 as a service that facilitates processing of product data of one or more products. In particular, the product data processing engine 210 may be engaged to obtain, process, store, transform, and/or communicate product data of products that are offered for sale on at least one e-commerce platform.

The product data processing engine 210 is configured to obtain multimedia data from customers. In particular, the product data processing engine 210 may be communicably connected to one or more customer devices 230. For example, a customer device 230 may transmit digital media (e.g., videos, images, etc.) depicting one or more products directly to the product data processing engine 210. The media data may, for example, be uploaded using a customer device 230 for transmission to the product data processing engine 210. Alternatively, the multimedia data may be received at the product data processing engine 210 via an intermediary system, such as a video broadcasting system.

The product data processing engine 210 includes a media processing module 212. The media processing module 212 performs operations for processing media data associated with recorded media that is provided by customers. For example, the media processing module 212 may receive an upload of a product video captured using a customer device 230. The product video may be in a compressed or uncompressed format. The media processing module 212 may supply the product video to one or more video encoders that compress the video data using one or more codecs (e.g., MPEG-2, H. 264, etc.).

The media processing module 212 may perform analysis of the content of uploaded media. In some embodiments, the media processing module 212 may perform object recognition in an uploaded product video. In particular, the media processing module 212 may implement detection of objects (e.g., persons, physical objects, etc.) and associated features and actions, in real-time, based on analysis of video and/or audio data of the uploaded media. For example, the media processing module 212 may be configured to detect parts of a product, such as product surfaces, features, etc., depicted in a product video.

The product data processing engine 210 also includes a three-dimensional modeling module 214. The three-dimensional modeling module 214 is configured to build, refine, and store one or more three-dimensional representations of products that are detected in digital media processed by the product data processing engine 210. In particular, the three-dimensional modeling module 214 represents surfaces of products using a collection of points and other geometric entities in three-dimensional space.

The product data processing engine 210, the customer devices 230, and the merchant system 240 may be in geographically disparate locations. Put differently, the customer devices 230 may be remote from one or both of the product data processing engine 210 and the merchant system 240. As described above, the customer devices 230, the merchant system 240, and the product data processing engine 210 may be computing systems.

The network 225 is a computer network. In some embodiments, the network 225 may be an internetwork such as may be formed of one or more interconnected computer networks. For example, the network 225 may be or may include an Ethernet network, an asynchronous transfer mode (ATM) network, a wireless network, or the like.

In some example embodiments, the product data processing engine 210 may be integrated as a component of an e-commerce platform. That is, an e-commerce platform may be configured to implement example embodiments of the product data processing engine 210. More particularly, the subject matter of the present application, including example methods for processing product-related multimedia data disclosed herein, may be employed in the specific context of e-commerce.

Figure 2:
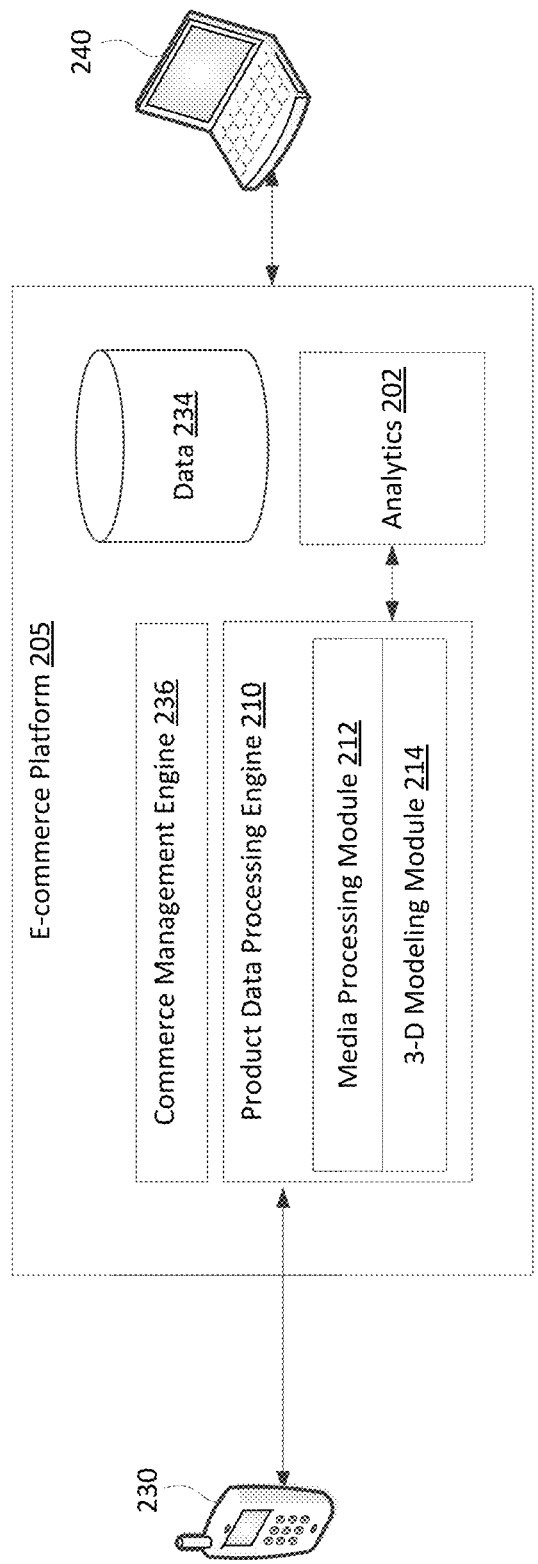
FIG. 2 is a block diagram of an e-commerce platform that is configured for implementing example embodiments of the product data processing engine of FIG. 1.

Reference is made to FIG. 2 which illustrates an example embodiment of an e-commerce platform 205 that implements a product data processing engine 210. The customer devices 230 and the merchant system 240 may be communicably connected to the e-commerce platform 205. In at least some embodiments, the customer devices 230 and the merchant system 240 may be associated with accounts of the e-commerce platform 105. Specifically, the customer devices 230 and the merchant system 240 may be associated with entities (e.g., individuals) that have accounts in connection with the e-commerce platform 205. For example, one or more customer devices 230 and merchant system 240 may be associated with customers (e.g., customers having e-commerce accounts) or merchants having one or more online stores in the e-commerce platform 205.

The e-commerce platform 205 includes a commerce management engine 236, a product data processing engine 210, a data facility 234, and a data store 202 for analytics relating to product-related media. The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts. In particular, the commerce management engine 236 may obtain account information for e-commerce accounts of customers and/or merchants associated with the e-commerce platform 205.

The functionality described herein may be used in commerce to provide improved customer or buyer experiences. The e-commerce platform 205 could implement the functionality for any of a variety of different applications, examples of which are described herein. Although the product data processing engine 120 of FIG. 2 is illustrated as a distinct component of the e-commerce platform 205, this is only an example. An engine could also or instead be provided by another component residing within or external to the e-commerce platform 205. In some embodiments, one or more applications that are associated with the e-commerce platform 205 may provide an engine that implements the functionality described herein to make it available to customers and/or to merchants. Furthermore, in some embodiments, the commerce management engine 236 may provide that engine. However, the location of the product data processing engine 210 may be implementation specific. In some implementations, the product data processing engine 210 may be provided at least in part by an e-commerce platform, either as a core function of the e-commerce platform or as an application or service supported by or communicating with the e-commerce platform. Alternatively, the product data processing engine 210 may be implemented as a stand-alone service to clients such as a customer device or a merchant device. In addition, at least a portion of such an engine could be implemented in the merchant device and/or in the customer device. For example, a customer device could store and run an engine locally as a software application.

The product data processing engine 210 is configured to implement at least some of the functionality described herein. Although the embodiments described below may be implemented in association with an e-commerce platform, such as (but not limited to) the e-commerce platform 105, the embodiments described below are not limited to e-commerce platforms.

The data facility 234 may store data collected by the e-commerce platform 205 based on the interaction of merchants and customers with the e-commerce platform 205. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data is obtained on the basis of inputs received via customer devices associated with the customers and/or prospective purchasers. By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 205 by merchants and customers (or prospective purchasers) may be collected and stored in the data facility 234.

The data facility 234 may include customer preference data for customers of the e-commerce platform 205. For example, the data facility 234 may store account information, order history, browsing history, and the like, for each customer having an account associated with the e-commerce platform 205. The data facility 234 may additionally store, for a plurality of e-commerce accounts, wish list data and cart content data for one or more virtual shopping carts.

Figure 3:
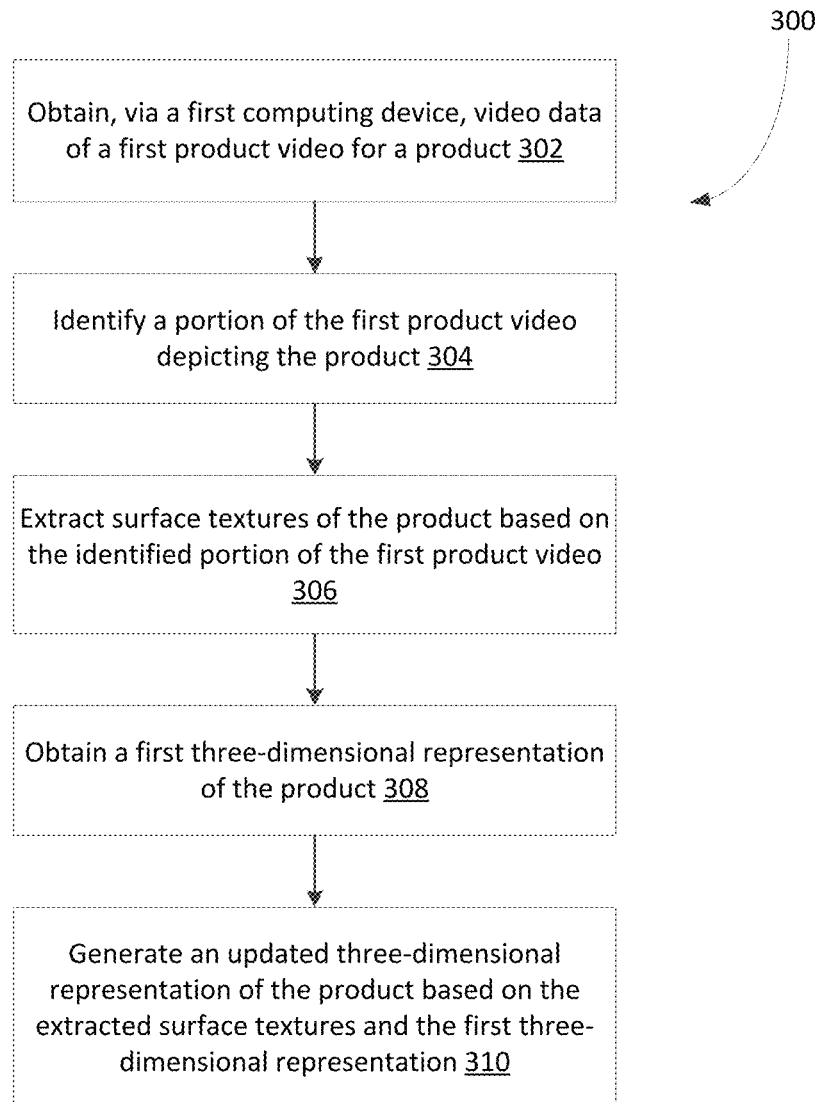
FIG. 3 shows, in flowchart form, an example method for modeling a product that is depicted in a product video.

Reference is now made to FIG. 3, which shows, in flowchart form, an example method 300 for modeling a product that is depicted in a product video. The method 400 may be performed by a computing system that implements digital media processing, such as the product data processing engine 210 of FIG. 1. As detailed above, the product data processing engine 210 may be a service that is provided within or external to an e-commerce platform. The product data processing engine 210 may generate control instructions for transmission to customer and/or merchant devices, in accordance with the method 300.

In operation 302, the product data processing engine obtains, via a first computing device, video data of a first product video. The first product video is a video that visually depicts a specific product. For example, the first product video may be a review video, such as an unboxing or product description video, that is created by a user of the product. The video data is transmitted via a computing device associated with a customer. The first product video may, for example, be captured using a media capture application on a customer device, and the video data of the first product video may be transmitted by means of a media upload that is initiated by the customer.

In some embodiments, the video data may be transmitted directly from the customer device to the product data processing engine. In particular, the product data processing engine may be configured to receive media upload that is initiated using the customer device. Alternatively, the product data processing engine may receive the video data from a video broadcasting system, such as the servers of an online social network. For example, the first product video may be a livestream video that is broadcast by a user of a social network, and the video data may be transmitted via the social network servers to the product data processing engine.

A customer may provide the first product video as part of a response to a request for product-related video data. In some embodiments, a customer may be prompted, by means of a request or notification that is presented on their device, to provide video data depicting a particular product. The customer may, for example, be a purchaser or user of the product and the request/notification may be provided to the customer following their purchase or during their usage of the product. The customer may receive a request/notification to capture a video that depicts the product. Upon capturing the requested video, the customer may initiate an upload of the video data using their device.

The customer may provide various supplementary information in addition to the video upload. The supplementary information may include, for example, product information, customer information, and description of the first product video. For example, the customer may input, using their device, certain product-related information for a product that is depicted in the first product video. The product information may include, without limitation: product type, identifier, and origin; merchant identifier; purchase date; length of time of use; and the like. The customer may also provide customer identifying information, such as customer name and type, as well as a description of the nature of the video. For example, the customer may indicate a trigger event (e.g., delivery of the product) or a customer interaction (e.g., unboxing, product review, etc.) associated with capture of the first product video. In some embodiments, the product, customer, and video information may be included in metadata associated with the uploaded product video.

In operation 304, the product data processing engine identifies at least one portion of the first product video that depicts the product. Specifically, the product data processing engine identifies parts of the first product video that includes visual depictions of the product. In at least some embodiments, the product data processing engine obtains video frames data for the first product video and identifies the at least one portion using video frames of the first product video. For example, the product data processing engine may perform video analysis of the first product video for detecting, tracking, and recognizing the product in the first product video. In particular, the video analysis may include object recognition using constituent frames of the first product video. The object recognition may be performed according to known techniques. The video frames that are determined to visually depict one or more parts of the product based on the video analysis may be labelled.

In operation 306, the product data processing engine extracts surface textures of the product based on the identified portion of the first product video. That is, upon identifying at least one portion of the first product video that depicts the product, the product data processing engine obtains surface texture data associated with the product. Surface texture indicates the nature of an interpreted surface—a portion of a real-world surface—and may be described using specialized terms, such as lay, waviness, and surface roughness. In particular, surface texture comprises the small, local deviations of a surface from the perfectly flat ideal. For purposes of the present application, the terms "surface texture" and "surface texture data" are used to broadly refer to data describing characteristics and appearance of a solid object's surface(s). Surface textures may be included in a wire frame model of a physical object, which is a visual representation of the three-dimensional physical object. In particular, surface textures may be added to a wire frame after completion of an initial rendering of the wire frame, for example, for greater graphical detail.

In at least some embodiments, the surface texture data may be obtained based on comparing to an existing (or known) three-dimensional representation of the product. Specifically, the product data processing engine may compare depicted parts of the product, as recognized in the first product video, with corresponding portions of an existing three-dimensional representation. The three-dimensional representation is a coordinate-based representation of surfaces of the product in three dimensions. In particular, the three-dimensional representation is a collection of data, namely points ("vertices") in three-dimensional space, which may be created manually, algorithmically, or by scanning. The vertices may be connected by a plurality of line segments to form a polygon mesh for approximating surfaces of the product—that is, the three-dimensional representation may be built as a textured polygonal model. Other forms of modeling, such as curve modeling, digital sculpting, etc., may be used for the three-dimensional representation.

The surface textures of the product may be extracted by first identifying matches between an existing polygonal model of the product and two-dimensional representations of parts of the product depicted in the first product video (for example, in the video frames). In some embodiments, the product data processing engine may perform image transformations (e.g., rotations, change of scale, projections, etc.) on the two-dimensional representations prior to or as part of comparing with the polygonal model of the product. For example, a two-dimensional representation of a depicted product in a video frame may be a two-dimensional image depicting at least part of a surface of the product. The two-dimensional image may undergo one or more transformations as part of a process for identifying a corresponding (i.e., matching) surface of the polygonal model.

In order to identify a match, the product data processing engine may identify landmark features (e.g., vertices) of the three-dimensional representation and/or the video frames of the first product video. The landmark features may be used to determine a mapping between the three-dimensional representation and the at least one portion (e.g., a video frame) of the first product video depicting the product. The mapping may, in turn, be used for extracting surface textures from video frames. Specifically, the product data processing engine may extract texture data for surfaces corresponding to faces of the three-dimensional representation of the product. For example, a product surface that is recognized in a video frame of the first product video may correspond to a polygonal face of the three-dimensional representation of the product. The product data processing engine may extract texture data (i.e., data describing surface texture) for the recognized surface.

In operation 308, the product data processing engine obtains a first three-dimensional representation of the product. The first three-dimensional representation may, for example, be a stored polygonal three-dimensional model of the product. In some embodiments, the first three-dimensional representation may be stored in a database containing product data. For example, the first three-dimensional representation may be stored in association with the product in a product database. The first three-dimensional representation is a current, or most recently updated, representation of the product in three dimensions. The first three-dimensional representation may, for example, be an initial representation (e.g., a computer-aided drawing or illustration) of the product that is provided by a merchant of the product.

In operation 310, the product data processing engine generates an updated three-dimensional representation of the product based on the extracted surface textures and the first three-dimensional representation. As explained above, the three-dimensional representation comprises a data set that represents surfaces of the product in three dimensions. The three-dimensional representation of the product may be updated to integrate the extracted surface texture data. In particular, a data set associated with the three-dimensional representation may be updated to include texture data of surfaces of the product that are recognized in the first product video.

In some embodiments, the updated three-dimensional representation may comprise extracted surface texture data for multiple surfaces. For each extracted surface texture, the data set may include information identifying the extracted texture, a corresponding surface of the first three-dimensional representation, and a trigger event or customer interaction associated with the first product video. In this way, the product data processing engine may process video data of videos that depict a particular product in order to build and refine (i.e., update) a robust three-dimensional representation of the product. The video data can be crowdsourced—in particular, product videos can be collected from a large group of users of the product, and a three-dimensional model of the product can be built based on all or a subset of the collected video data.

Additionally, or alternatively, the product data processing engine may receive feedback about an updated three-dimensional representation. The feedback may be about, for example, the accuracy or fidelity of an updated three-dimensional representation. The product data processing engine may incorporate this feedback into the updated three-dimensional representation. For example, the product data processing engine may assign confidence scores to extracted textures and/or updated three-dimensional representations based on received feedback.

Figure 4:
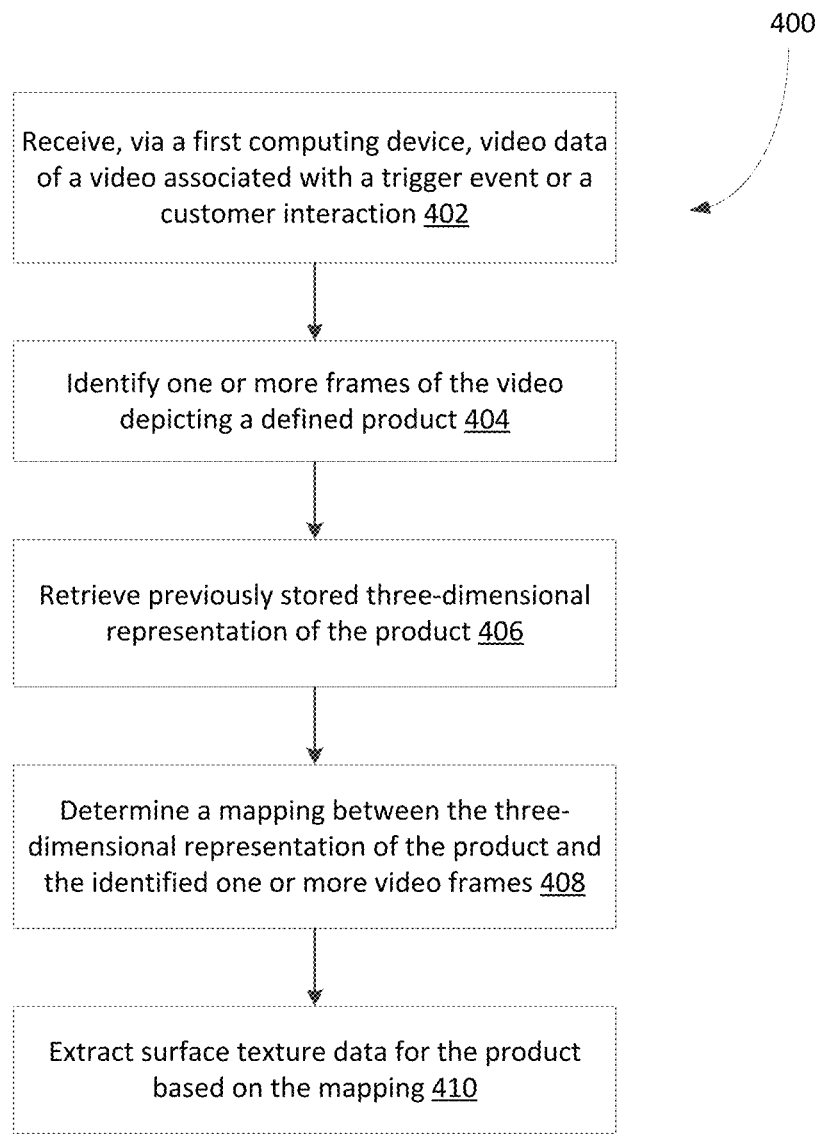
FIG. 4 shows, in flowchart form, an example method for acquiring a visual representation of a product that is depicted in a product video.

Reference is now made to FIG. 4, which shows, in flowchart form, an example method 400 for acquiring a visual representation of a product that is depicted in a product video. The method 400 may be performed by a computing system that implements digital media processing, such as the product data processing engine 210 of FIG. 1. The operations of method 400 may be performed in addition to, or as alternatives of, one or more of the operations of method 300. The product data processing engine 210 may generate control instructions for transmission to customer devices in accordance with the method 400.

In operation 402, the product data processing engine receives video data of a product video that is associated with a defined trigger event or customer interaction. A trigger event refers to an event which serves as a trigger, or motivation, for creating the product video. The trigger event may, for example, be delivery of an order for a product, usage of the product for a predetermined period of time, a user-specified product condition (e.g., defect, anomaly, etc.), and the like. A customer interaction refers to an interaction with the product by a customer that has used the product. In particular, the customer interaction may be an interaction that is depicted in the product video. The customer interaction may, for example, be an unboxing, a product review, and the like. In at least some embodiments, an indication of the trigger event and/or customer interaction may be received along with the video data. For example, metadata associated with the product video may include an indication of a trigger event or customer interaction associated with the product video. Additionally, or alternatively, the product data processing engine may receive other metadata, e.g., about the product video, the product, the trigger event, and/or the customer interaction.

In some embodiments, the product data processing engine may validate the product video prior to processing the video. The product video may be validated by, for example, verifying that the product video is associated with a particular product and that the video is provided by a customer that purchased and/or used the product. The validation may be performed based on, at least, user-inputted information about the product or customer and metadata associated with the product video. For example, a creator of a product video may input product and customer identifying information (e.g., product identifier, customer identifier, purchase receipt, etc.), and the product data processing engine may process the user-inputted information, video metadata, and any stored product information associated with the identified product in determining whether there is a match. The product video may be determined to be validated if there is an identified match.

In operation 404, the product data processing engine identifies one or more video frames of the product video depicting the product. Specifically, video frames that include a visual depiction of at least a part of the product are identified. For example, the product data processing engine may perform video analysis of the product video and identify frames that depict at least one surface of the product in the product video based on known object recognition techniques.

The product data processing engine retrieves a previously stored three-dimensional representation of the product, in operation 406. The stored three-dimensional representation comprises a data set for describing three-dimensional surfaces of the product. In particular, the stored three-dimensional representation is a current, or most recently updated, representation of the product in three dimensions. The product data processing engine builds and refines a three-dimensional representation based on video data collected from user-generated product videos, and stores the three-dimensional representation in association with the product.

In operation 408, the product data processing engine determines a mapping between the stored three-dimensional representation of the product and the identified video frames of the product video. Specifically, the mapping represents a correspondence between surfaces (e.g., faces) of the three-dimensional representation and product surfaces as depicted in video frames of the product video. The mapping may, for example, be an association of one or more vertices of the three-dimensional representation to portions of the video frames (i.e., two-dimensional images, or transformations thereof) depicting the corresponding vertices. The mapping thus indicates which elements (e.g., surfaces, lines, vertices) of the three-dimensional representation are depicted in the processed video frames.

In operation 410, the product data processing engine extracts surface texture data for the product based on the mapping determined in operation 408. In particular, the product data processing engine obtains texture data describing characteristics of one or more surfaces that are depicted in the product video using the mapping. In at least some embodiments, the surface texture data comprises two-dimensional image data depicting a product surface that corresponds to a surface (e.g., a polygonal face) of the three-dimensional representation. The product data processing engine may be configured to extract surface texture data for multiple surfaces. For each extracted surface, the product data processing engine may obtain data indicating the extracted texture, a corresponding surface of the three-dimensional model, a trigger event or customer interaction associated with the product video, and/or other metadata.

Figure 5:
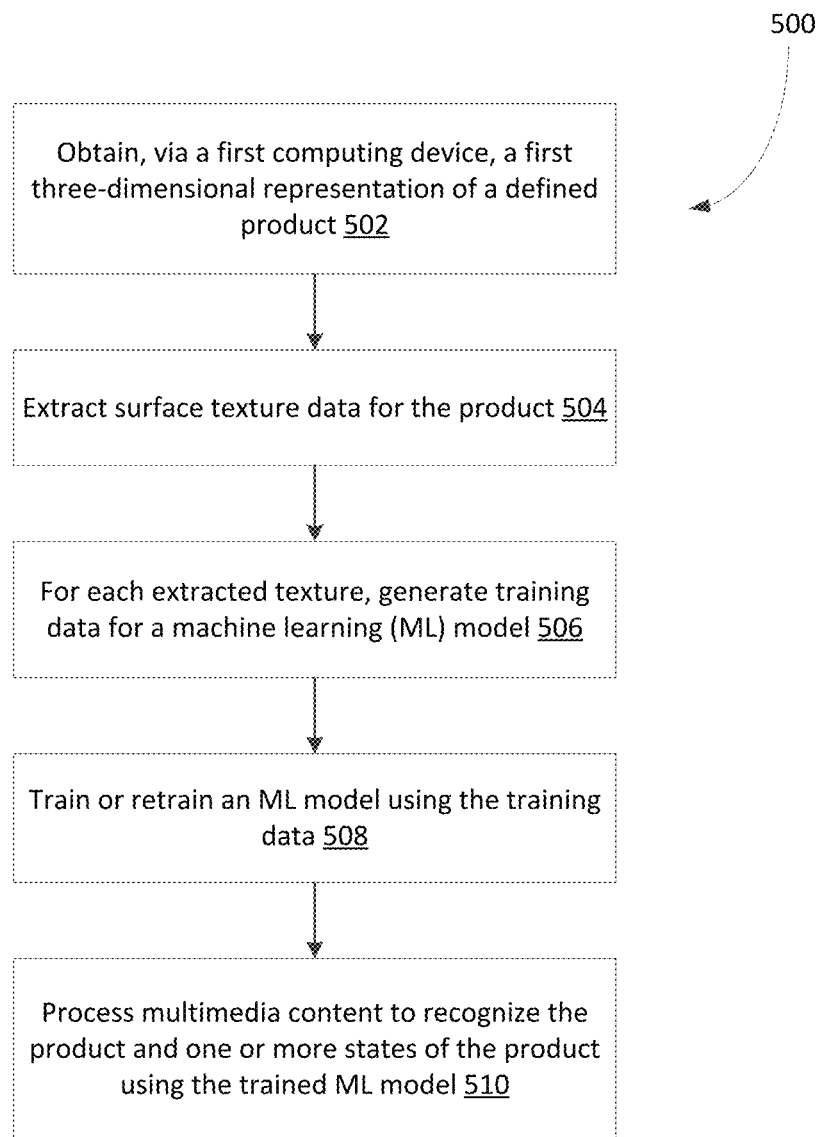
FIG. 5 shows, in flowchart form, an example method for real-time monitoring of features of a product that is depicted in multimedia content.

Reference is now made to FIG. 5, which shows, in flowchart form, an example method 500 for real-time monitoring of features of a product that is depicted in multimedia content. The method 500 may be performed by a computing system that implements digital media processing, such as the product data processing engine 210 of FIG. 1. The operations of method 500 may be performed in addition to, or as alternatives of, one or more of the operations of methods 300 and 400. The product data processing engine 210 may generate control instructions for transmission to customer devices in accordance with the method 500.

In operation 502, the product data processing engine obtains, via a first computing device, a first three-dimensional model of a product. In at least some embodiments, the first three-dimensional model may comprise a model of a product that is constructed from a plurality of images captured using the first computing device. For example, the three-dimensional model may be created based on a set of photographic images of a product, captured using a camera, by converting the images into a digital model. The three-dimensional model may be created using known photogrammetric processing techniques. The images may include overlapping photographs of the product and its surrounding space, taken from different camera locations (or "lines of sight").

In some embodiments, photogrammetric data may be complemented with range data. In particular, the first three-dimensional model may be generated based on camera data and LiDAR (or other laser scanner) data associated with the first computing device. The product data processing engine may collect LiDAR scanner measurements and use the measurement data for creating a three-dimensional model of the product. For example, the collected LiDAR data can be processed into a three-dimensional visualization, such as point clouds, and combined with photographic images in developing the first three-dimensional model.

The first computing device may be a customer device. Specifically, the camera data and scanner (e.g., LiDAR) data depicting the product may be supplied by a customer that has purchased or used the product. The first three-dimensional model data may be supplied, for example, in response to a detected trigger event or customer interaction associated with the product. By crowdsourcing camera and scanner data from customers, the product data processing engine may be configured to build and refine a robust three-dimensional representation of the product. In operation 504, the product data processing engine extracts surface texture data from the first three-dimensional model. That is, the product data processing engine obtains texture data describing characteristics of surfaces of the product as depicted in the first three-dimensional model. The surface texture data may comprise a data set that includes, at least, three-dimensional points and line segment data for describing one or more surfaces of the first three-dimensional model.

In some embodiments, machine learning techniques may be employed for refining a three-dimensional model of the depicted product. For each extracted texture, the product data processing engine creates training data for a machine learning model, in operation 506. In particular, the product data processing engine obtains data indicating the extracted texture, a corresponding surface of a three-dimensional representation of the product, and a trigger event or customer interaction associated with the first three-dimensional model.

In operation 508, the product data processing engine trains, or re-trains, a machine learning model using the training data. Specifically, a suitable machine learning algorithm is supplied with training data that is created based on the extracted surface texture data of the first three-dimensional model. That is, a machine learning model is trained on user-supplied data, such as camera and scanner data, for obtaining three-dimensional information of a depicted product.

The product data processing engine processes multimedia data and performs analysis of the multimedia content using the trained machine learning model, in operation 510. In particular, the product data processing engine may process multimedia, such as video, images, three-dimensional models (e.g., photogrammetry-based models), etc., recognize a product in the multimedia data, and determine one or more states of the product based on analysis of the multimedia content. The trained machine learning model may be used to process various different types of media which may be received from customer devices.

Additionally, or alternatively, feedback may be collected about the results of the analyses. For example, feedback may be collected about the accuracy of the determined product state. The feedback may be received from customer devices (e.g., via prompts asking about the accuracy of the determined product state). The feedback may be used to improve the machine learning model. For example, the feedback may be used to supplement the user-supplied data.

Figure 6:
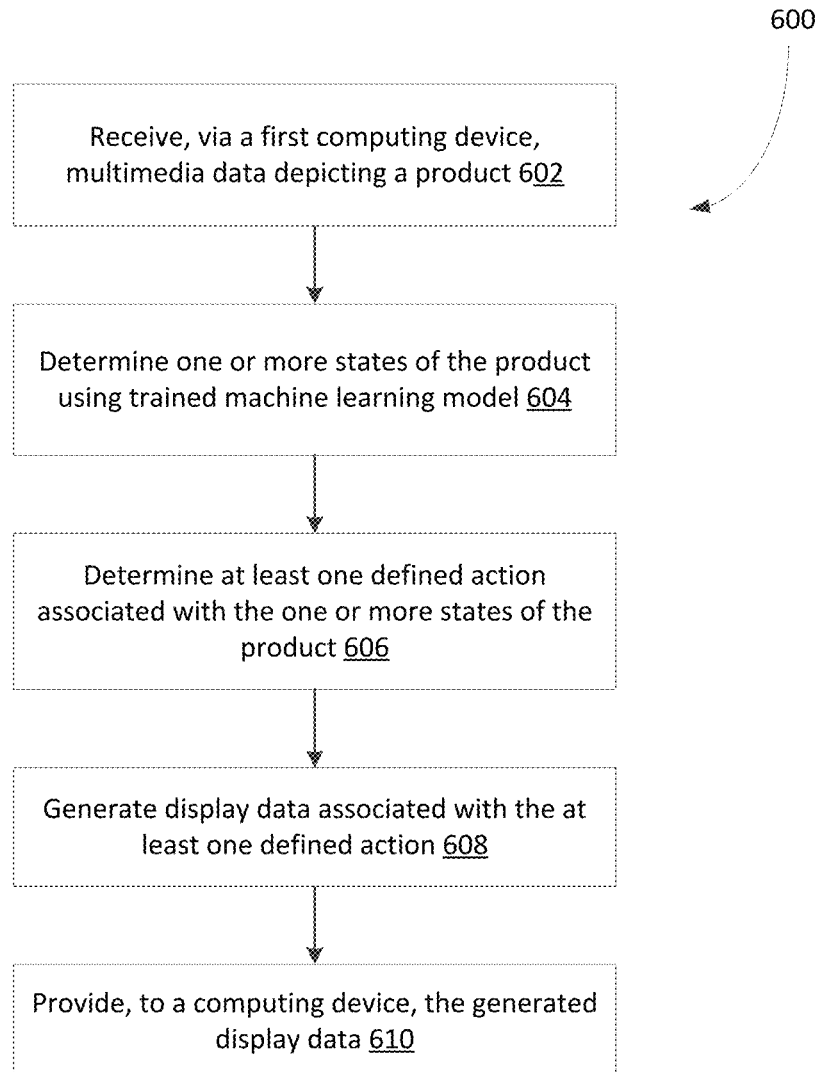
FIG. 6 shows, in flowchart form, an example method for generating notifications indicating one or more product-related actions associated with a featured product in user-generated content.

Reference is now made to FIG. 6, which shows, in flowchart form, an example method 600 for generating notifications indicating one or more product-related actions associated with a featured product in user-generated content. The method 600 may be performed by a computing system that implements digital media processing, such as product data processing engine 210 of FIG. 1. The operations of method 600 may be performed in addition to, or as alternatives of, one or more of the operations of methods 300 to 500. The product data processing engine 210 may generate control instructions for transmission to customer devices in accordance with the method 600.

The product data processing engine receives, via a first computing device, multimedia data depicting a product, in operation 602. The first computing device may be a customer device associated with a customer that has purchased or used the product. The multimedia data may include, for example, video data, image data, audio data, and the like. In at least some embodiments, the multimedia data may include supplementary data relating to the product and/or the customer. For example, the multimedia data may include metadata containing product information, customer identifier, and one or more defined trigger events or customer interactions associated with the multimedia data.

In operation 604, the product data processing engine determines one or more states of the product using a trained machine learning model. Training data based on crowd-sourced multimedia data may be created, as described above. In particular, surface texture data of products that is extracted from the multimedia data may be used as training data for a machine learning model associated with the depicted product. In some embodiments, the training data may include data identifying extracted surface textures, corresponding surfaces of a three-dimensional representation of the product, and one or more defined trigger events or customer interactions associated with the multimedia data.

The one or more states may represent visual conditions of the product. In particular, the machine learning model may output predicted visual conditions of the product associated with various different trigger events (e.g., product delivery) or customer interactions (e.g., unboxing, normal product usage, etc.). The product data processing engine may, in turn, use the output of the machine learning model to identify deviations from predicted visual conditions of the product. For example, the product data processing engine may be configured to identify defects, counterfeits, or other deficiencies based on identifying deviations from predictions that are made by the machine learning model regarding visual states of the product.

The product data processing engine determines at least one defined action associated with the one or more states of the product, in operation 606. For example, if a product defect condition is detected, an action associated with the defect may be sending feedback to a merchant that sells the product. Another example of an action associated with a product defect condition is sending, to the merchant, targeted advertisements or recommendations for suppliers and retailers who can provide the product to customers. Yet another action which may be associated with a product defect condition is sending, to customers, targeted advertisements regarding repairs and/or parts for the product.

In operation 608, the product data processing engine generates display data associated with the at least one defined action. For example, the product data processing engine may obtain display data of an advertisement for providing to a merchant and/or customer device in connection with the product. The display data may be generated by the product data processing engine, or obtained from a third-party source, such as a service provider associated with the identified at least one action. The product data processing engine then provides the generated display data to a computing device, in operation 610.

In any of the above-described example methods or processes it will be understood that certain operations described as occurring in sequence may be implemented in a different sequence or carried out in parallel without impacting the overall functioning of the method or process.

Figure 7A:
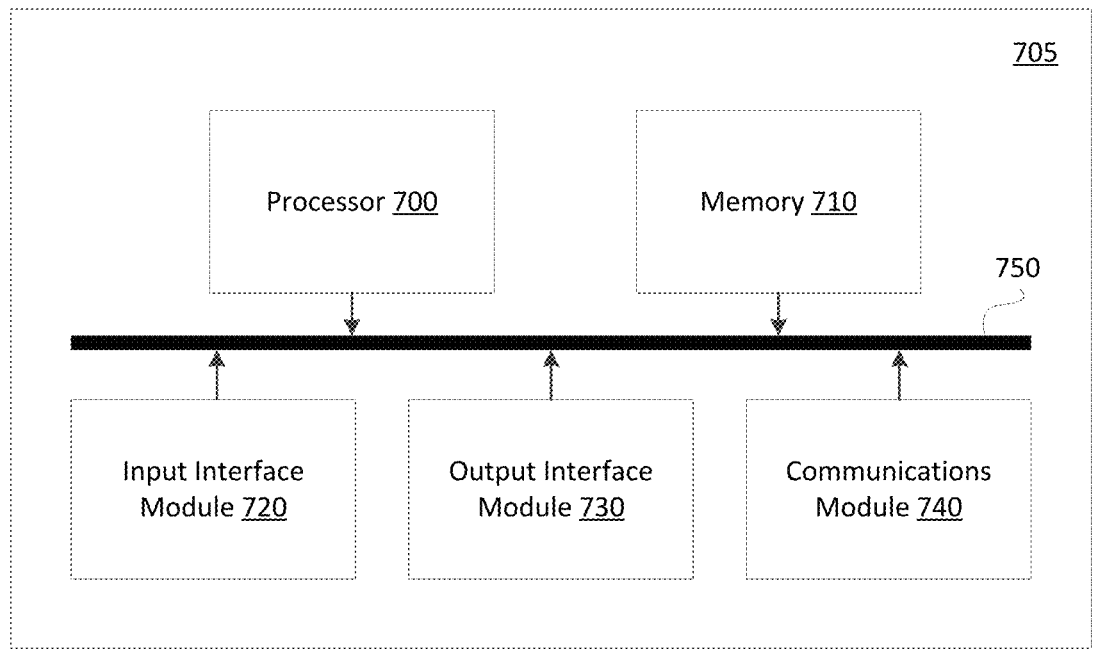
FIG. 7A is a high-level schematic diagram of a computing device.

Many of the above-described methods may be implemented by way of suitably-programmed computing device. FIG. 7A is a high-level operation diagram of an example computing device 705. The example computing device 705 includes a variety of modules. For example, as illustrated, the example computing device 705, may include a processor 700, a memory 710, an input interface module 720, an output interface module 730, and a communications module 740. As illustrated, the foregoing example modules of the example computing device 705 are in communication over a bus 750.

The processor 700 is a hardware processor. The processor 700 may, for example, be one or more ARM, Intel x86, PowerPC processors or the like.

The memory 710 allows data to be stored and retrieved. The memory 710 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 705.

The input interface module 720 allows the example computing device 705 to receive input signals. Input signals may, for example, correspond to input received from a user. The input interface module 720 may serve to interconnect the example computing device 705 with one or more input devices. Input signals may be received from input devices by the input interface module 720. Input devices may, for example, include one or more of a touchscreen input, keyboard, trackball or the like. In some embodiments, all or a portion of the input interface module 720 may be integrated with an input device. For example, the input interface module 720 may be integrated with one of the aforementioned example input devices.

The output interface module 730 allows the example computing device 705 to provide output signals. Some output signals may, for example, allow provision of output to a user. The output interface module 730 may serve to interconnect the example computing device 705 with one or more output devices. Output signals may be sent to output devices by output interface module 730. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 730 may be integrated with an output device. For example, the output interface module 730 may be integrated with one of the aforementioned example output devices.

The communications module 740 allows the example computing device 705 to communicate with other electronic devices and/or various communications networks. For example, the communications module 740 may allow the example computing device 705 to send or receive communications signals. Communications signals may be sent or received according to one or more protocols or according to one or more standards. For example, the communications module 740 may allow the example computing device 705 to communicate via a cellular data network, such as for example, according to one or more standards such as, for example, Global System for Mobile Communications (GSM), Code Division Multiple Access (CDMA), Evolution Data Optimized (ENDO), Long-term Evolution (LTE) or the like. Additionally, or alternatively, the communications module 740 may allow the example computing device 705 to communicate using near-field communication (NFC), via Wi-Fi™, using Bluetooth™ or via some combination of one or more networks or protocols. Contactless payments may be made using NFC. In some embodiments, all or a portion of the communications module 740 may be integrated into a component of the example computing device 705. For example, the communications module may be integrated into a communications chipset.

Software comprising instructions is executed by the processor 700 from a computer-readable medium. For example, software may be loaded into random-access memory from persistent storage of memory 710. Additionally, or alternatively, instructions may be executed by the processor 700 directly from read-only memory of memory 710.

Figure 7B:
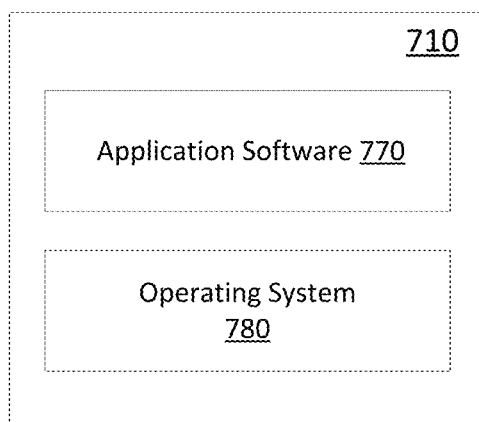
FIG. 7B shows a simplified organization of software components stored in a memory of the computing device of FIG. 7A.

FIG. 7B depicts a simplified organization of software components stored in memory 710 of the example computing device 105. As illustrated these software components include an operating system 780 and application software 770.

The operating system 780 is software. The operating system 780 allows the application software 770 to access the processor 700, the memory 710, the input interface module 720, the output interface module 730, and the communications module 740. The operating system 780 may be, for example, Apple iOS™, Google's Android™, Linux™, Microsoft Windows™, or the like.

The application software 770 adapts the example computing device 705, in combination with the operating system 780, to operate as a device performing particular functions.

Example E-Commerce Platform

Although not required, in some embodiments, the methods disclosed herein may be performed on or in association with an e-commerce platform. An example of an e-commerce platform will now be described.

Figure 8:
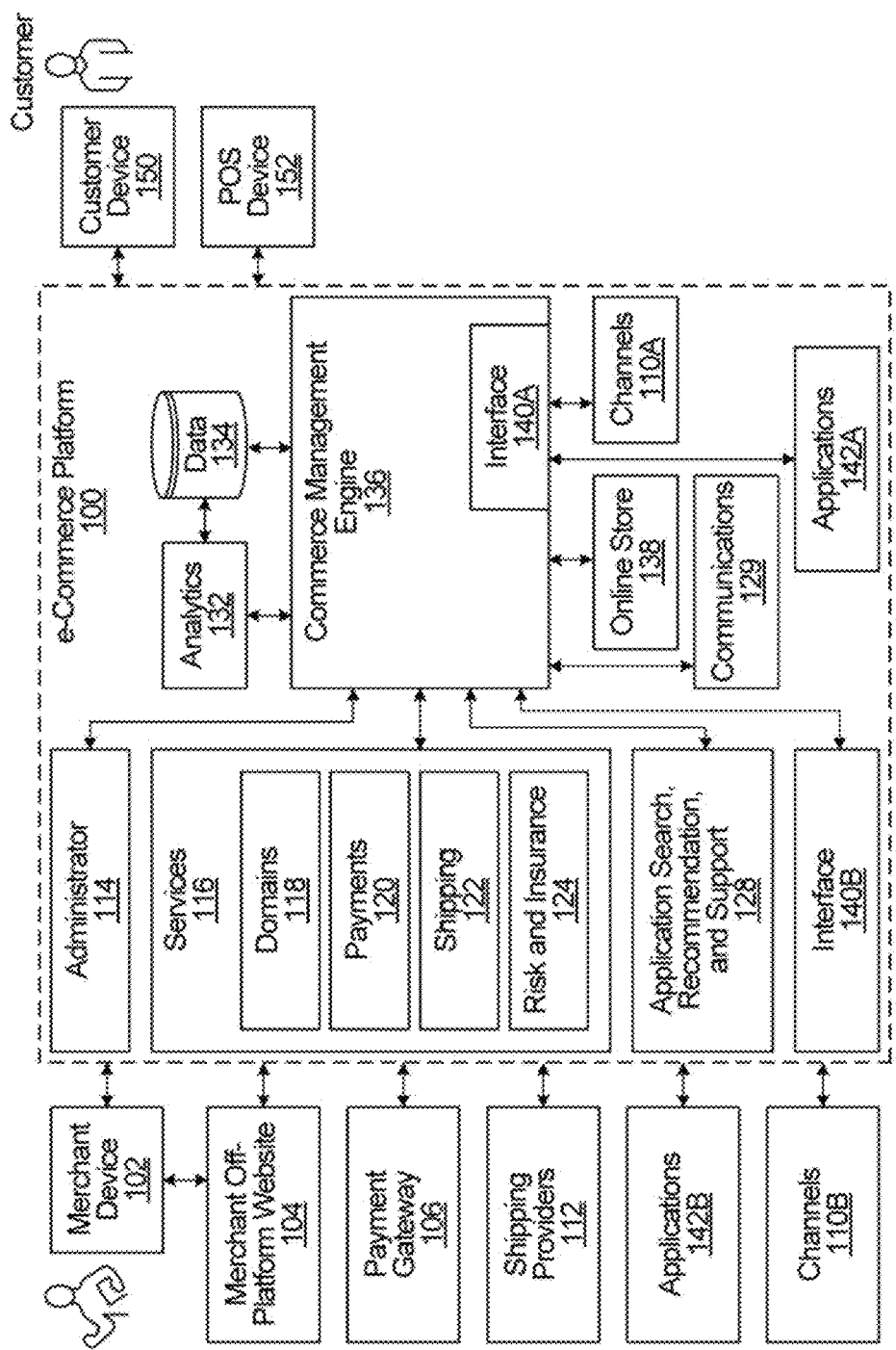
FIG. 8 is a block diagram of an e-commerce platform, in accordance with an example embodiment.

FIG. 8 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 8, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 9:
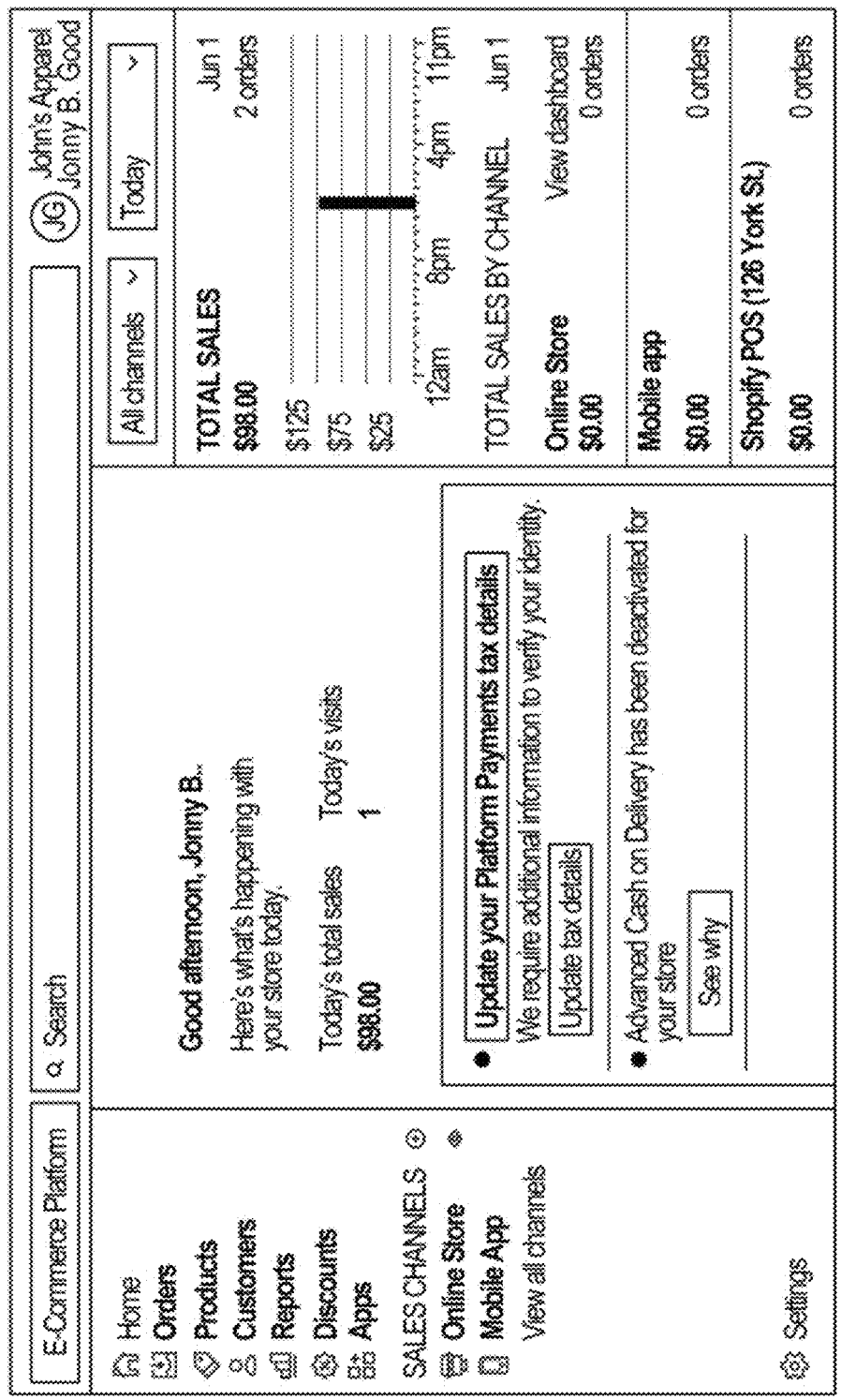
FIG. 9 is an example of a home page of an administrator, in accordance with an example embodiment.

FIG. 9 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 9. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 8, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
obtaining, via a first computing device, video data of a first product review video for a product;
identifying a portion of the first product review video depicting the product;
obtaining a first three-dimensional representation of the product comprising a data set that represents surfaces of the product in three dimensions;
extracting surface texture data of the product from video frames of the first product review video; and
generating an updated three-dimensional representation of the product based on updating the data set to include the extracted surface texture data.

2. The method of claim 1, wherein obtaining the first three-dimensional representation of the product comprises obtaining, via a second computing device, an initial three-dimensional representation of the product.

3. The method of claim 1, wherein the surface texture data of the product is extracted using a mapping between the first three-dimensional representation and one or more two-dimensional representations of surfaces of the product that are depicted in the video frames of the first product review video, the one or more two-dimensional representations corresponding to faces of the first three-dimensional representation.

4. The method of claim 1, wherein generating the updated three-dimensional representation comprises processing video frames of the first product review video using a machine learning (ML) model trained on product review videos for the product that are received from a plurality of first computing devices.

5. The method of claim 1, further comprising validating the first product review video based on at least one of user-inputted information or metadata associated with the first product review video.

6. The method of claim 5, wherein validating the first product review video comprises matching the user-inputted information or metadata with stored product information associated with the product.

7. The method of claim 1, wherein identifying the portion of the first product review video depicting the product comprises performing object recognition for recognizing the product using video frames of the first product review video.

8. The method of claim 1, further comprising:
detecting, based on the extracted surface texture data, at least one condition associated with the product; and
generating an indication identifying the detected at least one condition.

9. The method of claim 8, wherein detecting the at least one condition comprises identifying a customer interaction associated with the detected at least one condition.

10. The method of claim 9, wherein the customer interaction comprises one of: an order delivery event; a product unboxing event; or a product review event.

11. The method of claim 1, further comprising:
receiving, via a first computing device, a product search query; and
performing a product search based on the search query and the updated three-dimensional representation of the product.

12. The method of claim 1, further comprising obtaining camera data and LiDAR scanner data associated with the first computing device, wherein the updated three-dimensional representation is generated based on the camera data and the LiDAR scanner data.

13. A computing system, comprising:
a processor;
a memory coupled to the processor, the memory storing instructions that, when executed, configure the processor to:
obtain, via a first computing device, video data of a first product review video for a product;
identify a portion of the first product review video depicting the product;
obtain a first three-dimensional representation of the product comprising a data set that represents surfaces of the product in three dimensions;
extract surface texture data of the product from video frames of the first product review video;
generate an updated three-dimensional representation of the product based on updating the data set to include the extracted surface texture data.

14. The computing system of claim 13, wherein obtaining the first three-dimensional representation of the product comprises obtaining, via a second computing device, an initial three-dimensional representation of the product.

15. The computing system of claim 13, wherein the surface texture data of the product is extracted using a mapping between the first three-dimensional representation and one or more two-dimensional representations of surfaces of the product that are depicted in the video frames of the first product review video, the one or more two-dimensional representations corresponding to faces of the first three-dimensional representation.

16. The computing system of claim 13, wherein generating the updated three-dimensional representation comprises processing video frames of the first product review video using a machine learning (ML) model trained on product review videos for the product that are received from a plurality of first computing devices.

17. The computing system of claim 13, wherein identifying the portion of the first product review video depicting the product comprises performing object recognition for recognizing the product using video frames of the first product review video.

18. The computing system of claim 13, wherein the instructions, when executed, further configure the processor to:
detect, based on the extracted surface texture data, at least one condition associated with the product; and
generate an indication identifying the detected at least one condition.

19. The computing system of claim 18, wherein detecting the at least one condition comprises identifying a customer interaction associated with the detected at least one condition.

20. A non-transitory, computer-readable medium storing computer-executable instructions that, when executed by a processor, configure the processor to:
obtain, via a first computing device, video data of a first product review video for a product;
identify a portion of the first product review video depicting the product;
obtain a first three-dimensional representation of the product comprising a data set that represents surfaces of the product in three dimensions;
extract surface texture data of the product from video frames of the first product review video; and
generate an updated three-dimensional representation of the product based on updating the data set to include the extracted surface texture data.

* * * * *